United States Patent [19]

Maeshima

[11] Patent Number: 4,922,118
[45] Date of Patent: May 1, 1990

[54] APPARATUS FOR INCREASING NUMBER OF SCANNING LINES

[75] Inventor: Kazuya Maeshima, Nagasaki, Japan

[73] Assignee: Mitsubishi Denki Kabushiki Kaisha, Tokyo, Japan

[21] Appl. No.: 353,526

[22] Filed: May 18, 1989

[30] Foreign Application Priority Data

Jul. 8, 1988 [JP] Japan .................. 63-168980

[51] Int. Cl.⁵ .......................................... H04N 11/06
[52] U.S. Cl. ...................................... 358/140; 358/11; 358/158
[58] Field of Search ................ 358/11, 140, 148, 150, 358/158, 159, 160

[56] References Cited

U.S. PATENT DOCUMENTS

| | | | |
|---|---|---|---|
| 3,172,951 | 3/1965 | Field | 358/158 |
| 4,658,293 | 4/1987 | Arai et al. | 358/140 |
| 4,802,009 | 1/1989 | Hartmeier | 358/159 X |
| 4,831,441 | 5/1989 | Ando | 358/140 |

FOREIGN PATENT DOCUMENTS 61-84183  4/1986  Japan .
61-139174 6/1986  Japan .

Primary Examiner—James J. Groody
Assistant Examiner—Victor R. Kostak
Attorney, Agent, or Firm—Burns, Doane, Swecker & Mathis

[57] ABSTRACT

The present invention relates to a scanning line converter which converts the number of scanning lines into a multiple thereof. Write-clock-pulses and read-clock-pulses for controlling read/write accesses to a video memory, are produced on a basis of signals obtained by differentiating both a horizontal synchronizing signal and a double-speed horizontal synchronizing signal with respect to stable master clock pulses. The double-speed horizontal synchronizing signal is stabilized by a method, wherein double-speed horizontal oscillation pulses with a multiple frequency of the horizontal synchronizing signal, are delayed and further converted to a saw-tooth-wave signal, and the phase errors between the saw-tooth-wave signal and the horizontal synchronizing signal are fed back to the double-speed horizontal pulse oscillator.

6 Claims, 4 Drawing Sheets

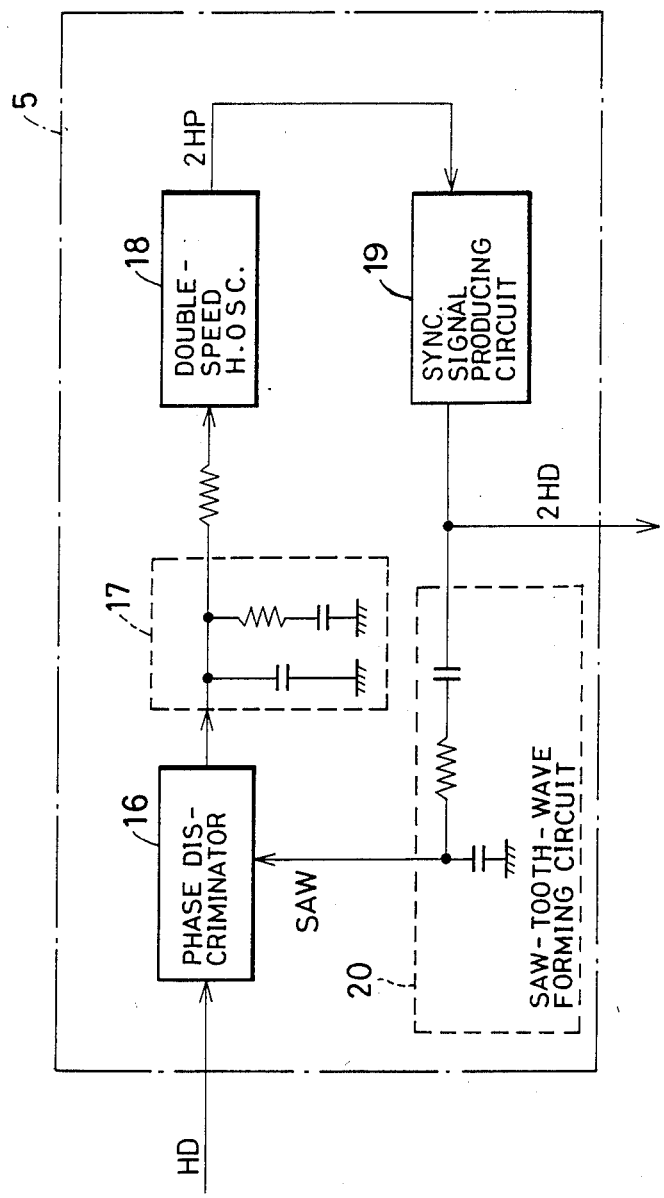

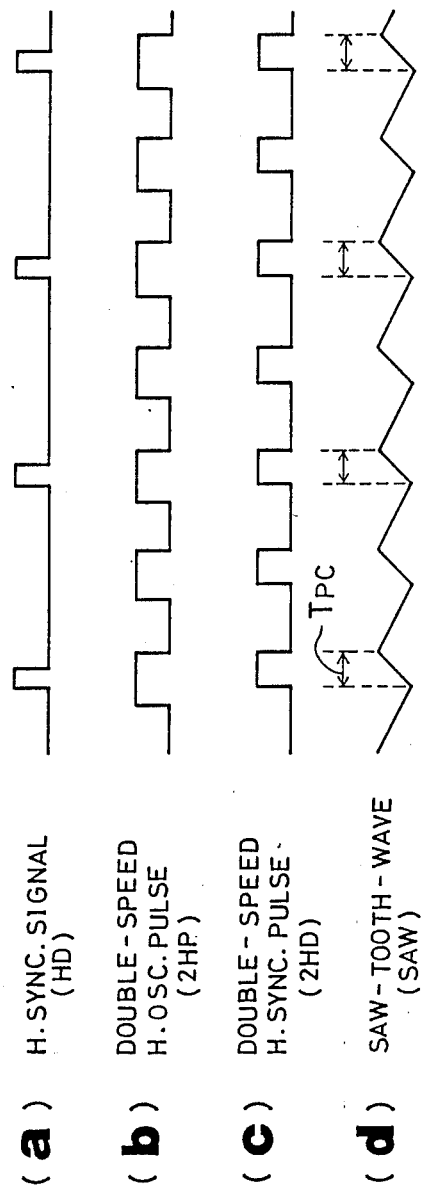

APPARATUS FOR INCREASING NUMBER OF SCANNING LINES

BACKGROUND OF THE INVENTION

1. Field of the Invention

The present invention relates to a scanning line converter to make scanning lines inconspicuous even in a large sized picture by converting the number of scanning lines per frame of a television signal, used in NTSC or PAL color television systems, into a multiple number thereof.

2. Description of the Prior Art

FIG. 1 is a block diagram showing a conventional scanning line converter. With reference to FIG. 1, 1 is a decoder which extracts a video signal, horizontal synchronizing signal HD and vertical synchronizing signal VD from a television signal; 2 is an analog/digital converter (hereinafter referred to as A/D converter) which digitizes a video signal; 3 is a video memory which memorizes each field, frame or line of the digitized video signal; 4 is a digital/analog converter (hereinafter referred to as D/A converter) which converts a digital video signal into an analog video signal; 12 is a phase comparator which compares the phase of the horizontal synchronizing signal HD with that of the output of a frequency demultiplying counter 15; 13 is a low-pass filter; 14 is a voltage control oscillator (hereinafter referred to as VCO); 11 is a timing pulse generating circuit for producing a control signal or a synchronizing signal for the video memory 3.

Following are the explanations of operation. The decoder 1 converts a television signal into a video signal with chrominance information of R, G and B, as well as extracting a horizontal synchronizing signal HD and a vertical synchronizing signal VD. The phase comparator 12 compares the phase of the separated horizontal synchronizing signal HD with that of a pulse H produced by the frequency demultiplying counter 15. An error voltage obtained by the phase comparison is supplied to VCO 14 through a low-pass filter 13. An oscillation frequency of VCO 14 is varied according to the error voltage. A frequency of a clock pulses RCK produced by VCO 14 is demultiplied with the frequency demultiplying counter 15. The frequency demultiplying counter 15 demultiplies the frequency of the clock pulses RCK by a factor of two, to produce write-clock-pulses WCK for writing video memory, and further demultiplies the frequency of the pulses WCK to produce the pulses H of which the phases are compared with that of the horizontal synchronizing signal HD by the phase comparator 12, and moreover it produces pulses 2H which have the double frequency of H and supplies them to the timing pulse generating circuit 11. The phase comparator 12 the low-pass filter 13, VCO 14 and the frequency demultiplying counter 15 constitute a phase-locked-loop PLL, and it produces read-clock-pulses RCK, write-clock-pulses WCK and double-speed horizontal synchronizing pulses 2H in synchronism with horizontal synchronizing pulses HD.

The video signals decoded by the decoder 1 are converted to digital data through the A/D converter 2, and after that the data are written into the video memory 3 in synchronism with the write-clock-pulses WCK. The read-out of the video memory 3 is performed two times for each line in synchronism with the read-clock-pulses RCK whose frequency is double the frequency of the write-clock-pulses WCK. The data thus read-out are converted to analog data through the D/A converter 4 to obtain a video signal of double speed. The roughness of a picture on a CRT can be made less conspicuous by converting the number of scanning lines to a number double the original.

A conventional scanning line converter is constituted as described above and write-clock-pulses, read-clock-pulses and double-speed horizontal synchronizing signal are produced with the phase-locked-loop, but if the frequency of the synchronizing signal in a television signal is not stable, it becomes impossible to supply stable write-clock-pulses, read-clock-pulses or the double-speed horizontal synchronizing signal, which may cause trouble in scanning line conversion. This is one of the drawbacks of the conventional scanning line converter.

SUMMARY OF THE INVENTION

The present invention contemplates solving the problem as mentioned above. It is an object of the present invention to provide a scanning line converter which can operate scanning line conversion stably even when the frequency of a synchronizing signal in a television signal is unstable due to fluctuations in frequency etc.

The scanning line converter according to this invention has a video memory in which read/write of a television signal can be performed, and obtains, on a basis of a horizontal synchronizing signal obtained from the television signal, a double-speed horizontal synchronizing signal from a double-speed horizontal synchronizing signal generating circuit, and also obtains master clock pulses from an oscillator, the master clock pulses being independent of each of these horizontal synchronizing signals. Each of these horizontal synchronizing signals is differentiated by a first and a second differentiating circuits, respectively, with respect to the master clock pulses. A frequency demultiplying counter and a double-speed frequency demultiplying counter are preset by the corresponding differentiated pulses, and write-clock-pulses and read-clock-pulses in synchronism with the master clock pulses are produced to provide a constitution in which the read/write of the video memory is stably controlled.

The double-speed horizontal synchronizing signal is of a saw-tooth-wave which is produced through a delay and a pulse-width processes of double-speed horizontal oscillation pulses produced from the horizontal synchronizing signal. The phase difference between the saw-tooth-wave and the horizontal synchronizing signal is detected, and the double-speed horizontal synchronizing signal is stabilized by controlling the double-speed horizontal oscillation pulses according to the detected error voltage.

BRIEF DESCRIPTION OF THE DRAWINGS

FIG. 3 illustrates a detailed block diagram of a double-speed horizontal synchronizing signal generating circuit shown in FIG. 2.

FIG. 4 illustrates a time chart which shows a signal waveform of each block in FIG. 3.

DETAILED DESCRIPTION OF THE PREFERRED EMBODIMENTS

Following are the explanations of an embodiment of the present invention with reference to the drawings.

Figure 1:
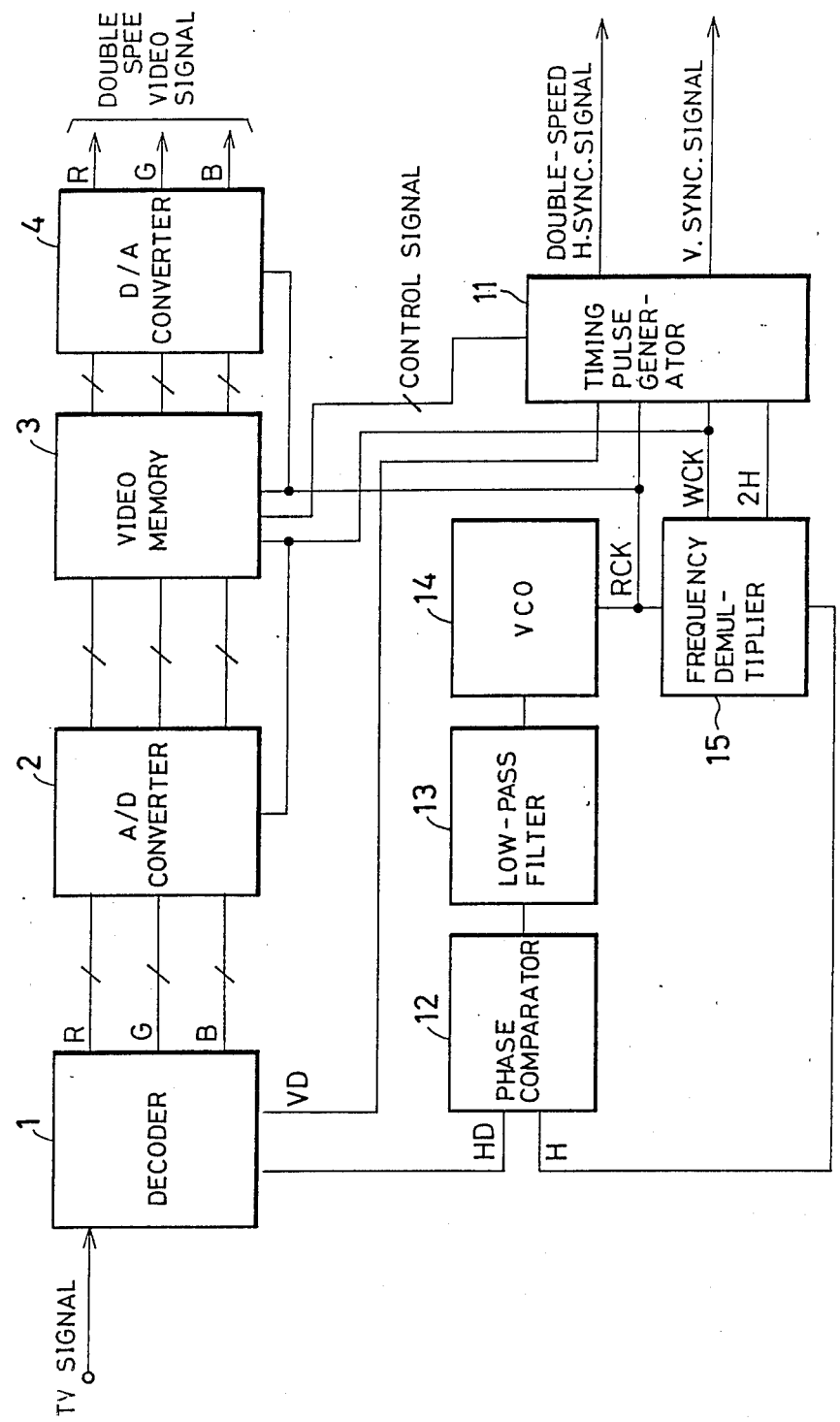
FIG. 1 illustrates a block diagram of a conventional scanning converter.
Figure 2:
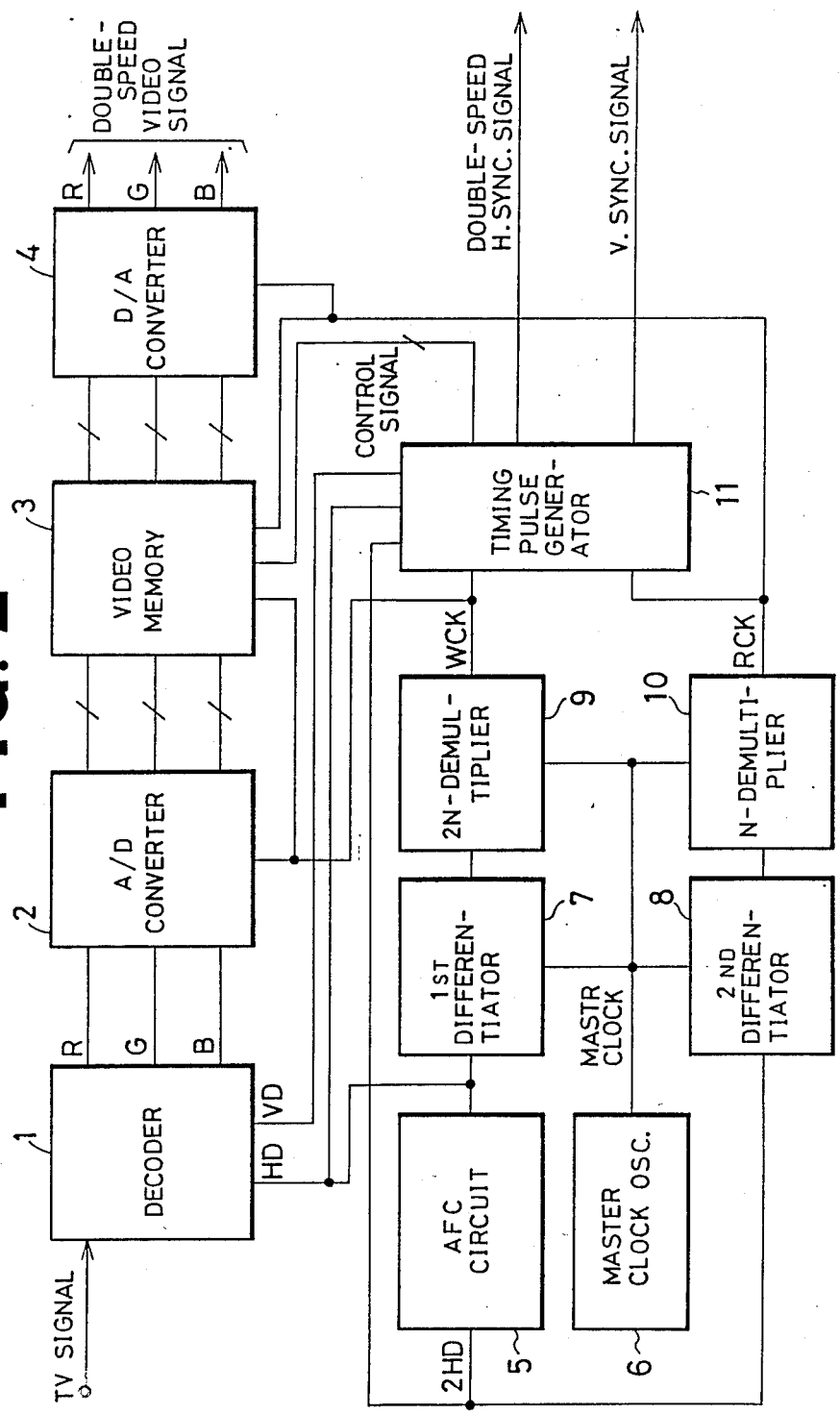
FIG. 2 illustrates a block diagram of a scanning converter according to a first embodiment of the invention.

In FIG. 2, 5 is an automatic frequency control circuit (hereinafter referred to as AFC), as a double-speed horizontal synchronizing signal producing circuit, for producing double-speed horizontal synchronizing pulses 2HD which operate as a double-speed horizontal synchronizing signal, from horizontal synchronizing pulses HD; 6 is a master clock oscillator which generates stable high-frequency master clock pulses; 7 and 8 are a first and a second differentiating circuits; 9 is a 2N-demultiplying counter; 10 is an N-demultiplying counter, as a double-speed demultiplying counter; 11 is a timing signal generator which generates a control signal or synchronizing signal for video memory 3. To the same blocks as those shown in FIG. 1 the same marks are given and the duplicated explanations are omitted.

FIG. 3 is a block diagram which illustrates in detail the inner part of the AFC circuit 5. In the diagram, 16 is a phase discriminator which performs the phase discrimination between the horizontal synchronizing signal HD and the double-speed horizontal synchronizing signal produced internally; 17 is an integrating circuit; 18 is a double-speed horizontal oscillator which has a free-running oscillation frequency of double the horizontal synchronizing signal HD; 19 is a synchronizing signal producing circuit; 20 is a saw-tooth-wave forming circuit.

Following are the explanations of operation. In the first step, on the basis of a horizontal synchronizing signal HD extracted by the decoder 1, double-speed horizontal synchronizing pulses 2HD are produced by AFC circuit 5. Both horizontal synchronizing signal HD and double-speed horizontal synchronizing pulses 2HD are differentiated respectively at the differentiating circuits 7 and 8 with respect to the stable high-frequency master clock pulses generated by a master clock oscillator 6. The 2N-demultiplying counter 9 is preset by differentiated pulses of the horizontal synchronizing signal HD, and the output of the 2N-demultiplying counter 9 clocked by the master clock pulses, becomes write-clock-pulses WCK which are synchronizing with the horizontal synchronizing signal HD in phase error by only a single master clock. Similarly, the N-demultiplying counter 10 is preset by differentiated pulses of the double-speed horizontal synchronizing pulses 2HD, and read-clock-pulses RCK are produced in synchronism with the double-speed horizontal synchronizing pulses in phase error by a single master clock. The write-clock-pulses WCK and the read-clock-pulses RCK are normalized by stable master clock pulses, so that the effect of fluctuations of the horizontal synchronizing signal HD etc. can be removed. The higher the oscillation frequency of the master clock pulses and the larger the frequency demultiplying rate N of the N-demultiplying counter are set up, the smaller the respective phase errors described above can be obtained.

The video signal decoded with the decoder 1, as mentioned in the prior art description, is converted to a digital signal with the A/D converter 2 and after that it is written in the video memory 3 in synchronism with the write-clock-pulses WCK obtained as mentioned above. The read-out of the video memory 3 is performed two times for each line in synchronism with the read-clock-pulses RCK obtained as mentioned above. The data thus read out are converted to analog data with the D/A converter 4, and the double speed video signal is obtained. By the conversion of the number of scanning lines to double the original number, a picture in which the roughness of the scanning lines is inconspicuous is produced stably on a CRT.

In the AFC circuit 5 shown in FIG. 3, there is a double speed pulse oscillator 18 for horizontal synchronization as shown in FIG. 4(a) and (b). The free-running oscillation frequency of the oscillator 18 is just double the frequency of the horizontal synchronizing signal HD, and it produces double-speed horizontal oscillation pulses 2HP. In the synchronizing signal producing circuit 19, the double-speed horizontal oscillation pulses 2HP produced with the double-speed horizontal oscillator 18, are delayed and the pulse width thereof is changed to form a double-speed horizontal synchronizing signal 2HD, the double-speed horizontal synchronizing pulses, as shown in FIG. 4(c). In the saw-tooth-wave forming circuit 20, on the basis of the double-speed horizontal synchronizing pulses 2HD, saw-tooth-waves SAW are produced as shown in FIG. 4(d). In the phase discriminator circuit 16, the phase change at Tpc, a rising portion of the saw-tooth-wave SAW, is detected referring to the horizontal synchronizing signal, and the detected value is output as an error voltage. The error voltage is smoothed out with the integrating circuit 17 and fed back to the double-speed horizontal oscillator 18. The difference between this AFC circuit 5 and an ordinary AFC circuit is that the frequency of the double-speed horizontal oscillator is double the frequency of the reference frequency, that of the horizontal synchronizing signal HD, so that the phase discrimination is performed only once in every two cycles of the saw-tooth-waves SAW. Thereby, double-speed horizontal synchronizing pulses are produced which are not easily affected by the fluctuations or jitters of the horizontal synchronizing signal.

What is claimed is:

1. An apparatus for increasing a number of scanning lines, comprising:
   a video memory for reading/writing a video signal of a television signal,
   a double-speed horizontal synchronizing signal producing circuit for producing a double-speed horizontal synchronizing signal from a horizontal synchronizing signal extracted from said television signal,
   a master clock oscillator for generating master clock pulses as a reference signal independent of both the horizontal synchronizing signal and the double-speed horizontal synchronizing signal,
   a first differentiating circuit and a second differentiating circuit for differentiating said horizintal synchronizing signal and said double-speed horizontal synchronizing signal, respectively, with respect to said master clock pulses,
   a frequency demultiplying counter and a double-speed frequency demultiplying counter being preset with respective differentiating pulses obtained from said first and second differentiating circuit, for outputting write-clock-pulses and read-clock-pulses, respectively, in synchronism with said master clock pulses.

2. An apparatus according to claim 1, wherein a master clock frequency of said master clock oscillator is higher than the frequency of said double-speed horizontal synchronizing signal.

3. An apparatus according to claim 2, wherein said double-speed horizontal synchronizing signal producing circuit is of an automatic frequency control circuit.

4. An apparatus according to claim 3, wherein said automatic frequency control circuit comprises;
- a double-speed horizontal oscillator for generating double-speed horizontal oscillation pulses having a frequency which is double the frequency of the horizontal synchronizing signal,
- a synchronizing signal producing circuit for delaying said double-speed horizontal oscillation pulses,
- a saw-tooth-wave forming circuit for converting an output signal of the synchronizing signal producing circuit into a saw-tooth-wave signal,
- a phase discriminating circuit for performing phase discrimination between said saw-tooth-wave signal and the horizontal synchronizing signal,
- an integrating circuit for smoothing an output signal of the phase discriminating circuit to output a smoothed signal to said double-speed horizontal oscillator.

5. An apparatus according to claim 4, wherein said phase discriminating circuit detects phase displacement at a rising portion of said saw-tooth-wave signal taking said horizontal synchronizing signal as a time reference, and outputs a result of the detection.

6. An apparatus according to claim 5, wherein said double speed horizontal synchronizing signal is output from the output terminal of said synchronizing signal producing circuit.

* * * * *